3,054,821
PHOSPHONIC ACID ESTERS AND PREPARATION
THEREOF
Robert J. Rolih, Lockport, and Ellis K. Fields, Chicago, Ill., assignors to Standard Oil Company, Chicago, Ill., a corporation of Indiana
No Drawing. Filed May 25, 1960, Ser. No. 31,553
9 Claims. (Cl. 260—461)

This invention relates to the preparation of the new composition of matter. More particularly, the invention relates to the preparation of esters from a reaction of aromatic hydrocarbons with a di-ester of phosphorous acid.

Organic phosphonic acids are known to have a great variety of useful applications. The organic phosphonates, as well as their acids and their salts, are effective wetting agents and detergents. They may be used as a plasticizer for many different plastics and/or resins. They have been used as lubricant additives, corrosion inhibitors, flameproofing agents and have found use in general household and agricultural chemicals such as, for example, insecticides, pesticides, plant growth regulators and the like.

Briefly described, the invention relates to the reaction of unsubstituted aromatic hydrocarbons and aromatic hydrocarbons substituted with alkyl, halogen, alkoxy, cyano, or carbalkoxy groups with di-esters of phosphorous acid in the presence of a free-radical reactant. The reaction is believed to follow the general formula:

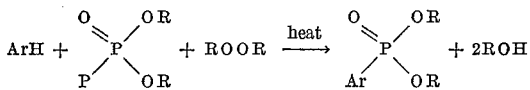

wherein R is an alkyl radical, aryl radical or a combination thereof.

A number of extremely reactive organic compounds have been found to be dissociate and form free radicals under the influence of various forms of energy such as, for example, under the influence of actinic light and under the influence of a predetermined quantity of heat. The free radical has an abnormal valence but will not carry an electrical charge. Certain free radicals are stable and capable of independent existence for an extended period of time such as, for example, a period in excess of one hour.

The process of the present invention is carried out in the presence of free radicals wherein the free radicals are in intimate contact with the reactants. The free radicals provide a means for substituting an ester of phosphorous acid into the aromatic ring.

The free-radical formers for the present process comprises compounds which dissociate into free radicals under the influence of a temperature within the range of from about 0° C. to about 200° C. Illustrative examples of compounds possessing such properties include: diethyl percarbonate; allyl percarbonate; benzoyl peroxide; acetyl peroxide; beta-chlorobenzoyl peroxide; methyl n-amyl ketone peroxide; methyl isobutyl ketone peroxide; methyl n-propyl ketone peroxide; methyl ethyl ketone peroxide; acetone peroxide; ethyl peroxide; methyl isobutyl peroxide; dicyclohexyl peroxide; di-tertiary-butyl peroxide; tertiary-butyl hydroperoxide; tertiary-butyl perbenzoate; 2,2-bis(tertiary-butylperoxy)butane; di-tertiary-butyl dipermalonate; tertiary-amyl perbenzoate; di-tertiary-alkyl peroxides. The preferred organic peroxides are di-tertiary-alkyl peroxides, specifically di-tertiary-butyl peroxide, tertiary-butyl perbenzoate, and di-tertiary-butyl dipermalonate. These organic peroxides are preferable because of their stability with respect to handling and their stability with respect to storing.

The amount of free-radical reactant employed for the purpose of this invention may vary from about ¼ mole per mole of phosphite to about 2 mole per mole of phosphite; the preferred ratio being about ½ mole of free-radical reactant per mole of phosphite.

The unsubstituted aromatic hydrocarbons and alkyl substituted aromatic hydrocarbons suitable for use in the present invention are: benzene; toluene; o-xylene; m-xylene; p-xylene; ethylbenzene; n-propylbenzene; cumene; 1,2,3-trimethylbenzene; 1,2,4-trimethylbenzene; mesitylene; p-cymene; 1,3-diethylbenzene; 1,4-diethylbenzene; 1,2,3,4-tetramethylbenzene; 1,2,3,5-tetramethylbenzene; 1,2,4,5-tetramethylbenzene; pentamethylbenzene; n-dodecylbenzene; biphenyl; o-terphenyl; m-terphenyl; p-terphenyl; p-quarterphenyl; 1,3,5-triphenylbenzene; diphenylmethane; 1,1-diphenylethane; bibenzyl; triphenylmethane; tetraphenylmethane; naphthalene; 1,2,3,4-tetrahydronaphthalene; 1-methylnaphthalene; 2-methylnaphthalene; fluorene, acenaphthene; anthracene; phenanthrene. The preferred alkyl aromatics are the aromatics having from 6 to about 16 carbon atoms.

The phosphite capable of being employed in the process of this invention are esters of phosphorous acid having the formula:

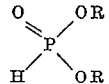

wherein R is an alkyl radical.

In general, the reaction temperature does not critically determine the free-radical substitution of the phosphorous acid structure in the aromatic hydrocarbon. However, as chemical reactions, in general, occur at a more rapid rate at elevated temperatures, it has been found particularly desirable for high yields to employ temperatures above the decomposition temperature of peroxide catalyst and below the decomposition temperature of the phosphonate produced by the reaction. Thus, the reaction temperature may be from about 0° to about 200° C. We, however, prefer to conduct the reaction at temperatures in the range of from about 125° C. to about 175° C.

The reaction mixture is preferably worked up by steam distillation. The unreacted aromatic compounds will steam distill and the unreacted di-hydrocarbon phosphite hydrolyzes, leaving the aryl phosphonate as an insoluble oil.

The following examples illustrate the methods of preparing the new composition of matter, but are not to be construed as limiting the invention.

*Example I*

A mixture of methyl benzoate (1 mole), diethyl phosphite (1 mole) and di-t-butyl peroxide (0.5 mole) was heated to reflux in a 100 ml. round-bottom 3-neck flask equipped with a magnetic stirrer, thermometer and condenser. Reaction was continued for 24 hours. The mixture was distilled in vacuo to recover unconverted methyl benzoate and diethyl phosphite. A separate fraction was collected at 83° C. and 3 mm. pressure. The residue was hydrolyzed to free phosphonic acid by refluxing for 4 hours with concentrated hydrochloric acid; the clear solution was evaporated in vacuo to a syrup that solidified on cooling. The solution was extracted with boiling cyclohexane, then recrystallized twice from water with charcoal, giving white crystals that melted at 377–379° C. This material was identified as p-carboxyphenyl phosphonic acid

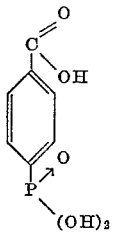

(in approximately 65% yield) by elemental analysis:

|  | Calculated | Found |
|---|---|---|
| Percent C | 41.4 | 41.6 |
| Percent H | 3.5 | 3.7 |
| Percent P | 15.3 | 15.4 |

The fraction boiling at 83° (3 mm.) was identified as diethyl isobutylphosphonate (45% yield) by its mass spectrum and by hydrolysis to isobutyl phosphonic acid, M.P. 122–124° C. The elemental analysis of the acid was as follows.

|  | Calculated | Found |
|---|---|---|
| Percent C | 34.7 | 34.2 |
| Percent H | 8.0 | 7.9 |
| Percent P | 22.4 | 21.4 |

Example II

A reaction mixture comprising 25 g. (0.2 mole) of naphthalene, 30 g. (0.21 mole) of di-methyl phosphite, and 10 ml. of di-t-butyl peroxide was heated to reflux in a 100 ml. round-bottom 3-neck flask equipped with a magnetic stirrer, thermometer and condenser. The reaction temperature increased to about 150° C., then dropped rapidly to 130° C. With continued heating, the temperature of the reaction mixture rose gradually to 136° C. At this time, 7½ hours, the reaction mixture was steam-distilled. The supernatant water was poured off the pot residue, and the aromatic liquid was extracted with CHCl₃ (2 x 200 ml. portions). The CHCl₃ was dried over anhydrous MgSO₄, filtered and evaporated on a Rinco evaporator. The yield of di-methyl naphthalenephosphate, containing 11.8% phosphorus, based on unrecovered naphthalene was 100%.

Example III

A reaction mixture comprising 25 g. (0.2 mole) of naphthalene, 30 g. (0.21 mole) of di-ethyl phosphite and 10 ml. of di-t-butyl peroxide was heated to reflux in a 100 ml. round-bottom 3-neck flask equipped with a magnetic stirrer, thermometer and condenser. The temperature increased to 150° C. and then dropped rapidly to 130° C. With continued heating, the temperature of the reaction mixture rose gradually to 136° C. At this time, 7½ hours, the reaction mixture was steam-distilled. Naphthalene came over in the distillate and the mixture remaining in the distillation flask became cloudy with yellow color. No more naphthalene appeared in the distillate after about a liter of water had distilled. The distillation was stopped. A thick yellow liquid appeared in the bottom of the distillation flask. The supernatant water was poured off and the organic liquid was extracted with CHCl₃ (2 x 200 ml. portions). The CHCl₃ was dried over anhydrous MgSO₄, filtered and evaporated on a Rinco evaporator. The yield of crude product was 20 g. Naphthalene recovered by steam distillation was filtered and dried; it weighed 15 g. The yield of di-ethyl naphthalenephosphonate

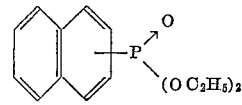

based on unrecovered naphthalene was 97%. Analyses on the crude product were:

|  | Calculated | Found |
|---|---|---|
| Percent C | 63.7 | 55.4 |
| Percent H | 6.48 | 6.67 |
| Percent P | 11.72 | 10.80 |

Example IV

A reaction mixture comprising 25 g. of 1-methyl-naphthalene, 30 g. of di-ethyl phosphite, and 10 ml. of di-t-butyl peroxide was heated to reflux in a 100 ml. round-bottom 3-neck flask equipped with a magnetic stirrer, thermometer and condenser. The reaction was continued for 7½ hours at a temperature of from 130° C. to about 150° C. The reaction mixture was steam distilled and the supernatent water poured off the pot residue. The aromatic liquid was extracted with CHCl₃ (2 x 200 ml. portions). The CHCl₃ was dried over anhydrous MgSO₄ and evaporated on a Rinco evaporator. The yield of di-ethyl 1-methylnaphthalenephosphonate, containing 11% phosphorus, based on unrecovered 1-methylnaphthalene was 92%.

Example V

A reaction mixture comprising 25 g. of 2-methyl-naphthalene, 30 g. of di-methyl phosphite, and 10 ml. of di-t-butyl peroxide was heated to reflux in a 100 ml. round-bottom 3-neck flask equipped with a magnetic stirrer, thermometer and condenser. The reaction was continued for 7½ hours at a temperature of from 130° C. to about 150° C. The reaction mixture was steam-distilled and the supernatent water poured off the pot residue. The aromatic liquid was extracted with CHCl₃ (2 x 200 ml. portions). The CHCl₃ was dried over anhydrous MgSO₄ and evaporated on a Rinco evaporator. The yield of di-methyl 2-methylnaphthalenphosphonate, containing 11.5% phosphorus, based on unrecovered 2-methylnaphthalene was 82%.

Example VI

A reaction mixture comprising 25 g. of 2-methyl-naphthalene, 30 g. of di-ethyl phosphite, and 10 ml. of di-t-butyl peroxide was heated to reflux in a 100 ml. round-bottom 3-neck flask equipped with a magnetic stirrer, thermometer and condenser. The reaction was continued for 7½ hours at a temperature of from 130° C. to about 150° C. The reaction mixture was steam-distilled and the supernatent water poured off the pot residue. The aromatic liquid was extracted with CHCl₃ (2 x 200 ml. portions). The CHCl₃ was dried over anhydrous MgSO₄ and evaporated on a Rinco evaporator. The yield of di-ethyl 2-methylnaphthalenephosphonate, containing 11% phosphorus, based on unrecovered 2-methylnaphthalene was 71%.

Example VII

A reaction mixture comprising 25 g. of 2,3-di-methyl-naphthalene, 30 g. of di-ethyl phosphite, and 10 ml. of di-t-butyl peroxide was heated to reflux in a 100 ml. round-bottom 3-neck flask equipped with a magnetic stirrer, thermometer and condenser. The reaction was continued for 7½ hours at a temperature of from 130° C. to about 150° C. The reaction mixture was steam-distilled and the supernatent water poured off the pot residue. The aromatic liquid was extracted with CHCl₃ (2 x 200 ml. portions). The $CHCl_3$ was dried over anhydrous $MgSO_4$ and evaporated on a Rinco evaporator. The yield of di-ethyl 2,3-dimethylnaphthalenephosphonate, containing 8.5% phosphorus, based on unrecovered 2,3-di-methylnaphthalene was 80%.

*Example VIII*

A reaction mixture comprising 25 g. of m-xylene, 30 g. of di-ethyl phosphite, and 10 ml. of di-t-butyl peroxide was heated to reflux in a 100 ml. round-bottom 3-neck flask equipped with a magnetic stirrer, thermometer and condenser. The reaction was continued for 7½ hours at a temperature of from 130° C. to about 150° C. The reaction mixture was steam-distilled and the supernatent water poured off the pot residue. The aromatic liquid was extracted with $CHCl_3$ (2 x 200 ml. portions). The $CHCl_3$ was dried over anhydrous $MgSO_4$ and evaporated on a Rinco evaporator. The yield of di-ethyl m-xylenephosphonate, containing 13.7% phosphorus, based on unrecovered m-xylene was 41%.

*Example IX*

A reaction mixture comprising 25 g. of mesitylene, 30 g. of di-ethyl phosphite, and 10 ml. of di-t-butyl peroxide was heated to reflux in a 100 ml. round-bottom 3-neck flask equipped with a magnetic stirrer, thermometer and condenser. The reaction was continued for 7½ hours at a temperature of from about 130° C. to about 150° C. The reaction mixture was steam-distilled and the super natent water poured off the pot residue. The aromatic liquid was extracted with $CHCl_3$ (2 x 200 ml. portions). The $CHCl_3$ was dried over anhydrous $MgSO_4$ and evaporated on a Rinco evaporator. The yield of di-ethyl mesitylenephosphonate, containing 8.1% phosphorus, based on unrecovered mesitylene was 57%.

*Example X*

A reaction mixture comprising 25 g. of benzene, 30 g. of diethyl phosphite, and 10 ml. of di-t-butyl peroxide was heated to reflux in a 100 ml. round-bottom 3-neck flask equipped with a magnetic stirrer, thermometer and condenser. Reaction was continued for 7 hours at a temperature of from 130° C. to 150° C. and a pressure of 140 p.s.i. The reaction mixture was steam-distilled and the combined organic and aqueous layers were extracted with benzene (3 x 150 ml.). The benzene layer was dried, filtered and evaporated. The yield of di-ethyl benzenephosphonate based on unrecovered benzene was 53.5%.

*Example XI*

A reaction mixture comprising 25 g. of toluene, 30 g. of diethyl phosphite, and 10 ml. of di-t-butyl peroxide was heated to reflux in a 100 ml. round-bottom 3-neck flask equipped with a magnetic stirrer, thermometer and condenser. Reaction was continued for 7 hours at a temperature of 130° C. to 150° C. and a pressure of 103 p.s.i. The reaction mixture was steam-distilled and the combined organic and aqueous layers were extracted with toluene (3 x 150 ml.). The toluene layer was dried, filtered and evaporated. The yield of di-ethyl toluenephosphonate based on unrecovered toluene was 67.0%.

*Example XII*

A reaction mixture comprising 25 g. of m-xylene, 30 g. of diethyl phosphite, and 10 ml. of di-t-butyl peroxide was heated to reflux in a 100 ml. round-bottom 3-neck flask equipped with a magnetic stirrer, thermometer and condenser. Reaction was continued for 15 hours at a temperature of 130° C. to 150° C. and a pressure of 65 p.s.i. The reaction mixture was steam-distilled and the combined organic and aqueous layers were extracted with m-xylene (3 x 150 ml.). The m-xylene layer was dried, filtered and evaporated. The yield of di-ethyl m-xylenephosphonate based on unrecovered m-xylene was 55.8%.

*Example XIII*

A reaction mixture comprising 25 g. of anisole, 30 g. of diethyl phosphite, and 10 ml. of di-t-butyl peroxide was heated to reflux in a 100 ml. round-bottom 3-neck flask equipped with a magnetic stirrer, thermometer and condenser. Reaction was continued for 2 hours at a temperature of 130° C. to 150° C. and a pressure of 65 p.s.i. The reaction mixture was steam-distilled and the combined organic and aqueous layers were extracted with anisole (3 x 150 ml.). The anisole layer was dried, filtered and evaporated. The yield of di-ethyl anisolephosphonate, containing 14.2% phosphorus, based on unrecovered anisole was 26%.

*Example XIV*

A reaction mixture comprising 25 g. of bromobenzene, 30 g. of di-ethyl phosphite, and 10 ml. of di-butyl peroxide was heated to reflux in a 100 ml. round-bottom 3-neck flask equipped with a magnetic stirrer, thermometer and condenser. Reaction was continued for 32 hours at a temperature of 130° C. to 150° C. and at atmospheric pressure. The reaction mixture was steam-distilled and the combined organic and aqueous layers were extracted with bromobenzene (3 x 150 ml.). The bromobenzene layer was dried, filtered and evaporated. The yield of di-ethyl bromobenzenephosphonate based on unrecovered bromobenzene was 54.3%.

*Example XV*

A reaction mixture comprising 25 g. of methyl benzoate, 30 g. of di-ethyl phosphite, and 10 ml. of di-t-butyl peroxide was heated to reflux in a 100 ml. round-bottom 3-neck flask equipped with a magnetic stirrer, thermometer and condenser. Reaction was continued for 10.5 hours at a temperature of 130° C. to 150° C. and at atmospheric pressure. The reaction mixture was steam-distilled and the combined organic and aqueous layers were extracted with methyl benzoate (3 x 150 ml.). The methyl benzoate layer was dried, filtered and evaporated. The yield of di-ethyl methylbenzoatephosphonate, containing 15.6% phosphorus, based on unrecovered methyl benzoate was 62.8%.

*Example XVI*

A reaction mixture comprising 25 g. of 1-methylnaphthalene, 30 g. of di-methyl phosphite, and 10 ml. of di-t-butyl peroxide was heated to reflux in a 100 ml. round-bottom 3-neck flask equipped with a magnetic stirrer, thermometer and condenser. The reaction was allowed to continue for a period of 7½ hours at a temperature of from about 130° C. to about 150° C. The reaction mixture was steam-distilled and the supernatent water poured off the pot residue. The aromatic liquid was extracted with $CHCl_3$ (2 x 200 ml. portions). The $CHCl_3$ was dried over anhydrous $MgSO_4$, filtered, and evaporated on a Rinco evaporator. The yield of di-methyl 1-methylnaphthalenephosphonate, containing 12.4% phosphorus, based on unrecovered 1-methylnaphthalene was 57%.

The invention claimed is:

1. A process for preparing a di-ester of aryl phosphonic acid comprising the steps of mixing methyl benzoate with di-ethyl phosphite in the presence of di-t-butyl peroxide at a temperature of from about 125° C. to about 175° C. for a period of about 24 hours and recovering a di-ester of aryl phosphonic acid.

2. A process for preparing a di-ester of aryl phosphonic acid comprising the steps of mixing naphthalene with di-methyl phosphite in the presence of di-t-butyl peroxide at a temperature of from about 125° C. to about 175° C. for a period of 7 hours and recovering a di-ester of aryl phosphonic acid.

3. A process for preparing a di-ester of aryl phosphonic acid comprising the steps of mixing benzene with di-ethyl phosphite in the presence of di-t-butyl peroxide at a temperature of from about 125° C. to about 175° C. and at a pressure in excess of 100 p.s.i. for a period of 7 hours and recovering a di-ester of aryl phosphonic acid.

4. A process for preparing a di-ester of aryl phosphonic acid comprising the steps of mixing toluene with di-ethyl phosphite in the presence of di-t-butyl peroxide at a temperature of from about 125° C. to about 175° C. and at a pressure in excess of 100 p.s.i. for a period of 7 hours and recovering a di-ester of aryl phosphonic acid.

5. A process for the preparation of a diester of an aromatic phosphonic acid having the structural formula

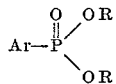

wherein Ar is an aryl radical and R is a lower alkyl radical which comprises: reacting an aromatic compound having at least one hydrogen substituent on the aromatic ring with a lower dialkyl ester of phosphorous acid in the presence of a free-radical reactant.

6. The process of claim 5 wherein the free-radical reactant is an organic peroxide.

7. The process of claim 5 wherein the free-radical reactant is present in the molar ratio of from about ¼ to about 2 moles per mole of said diester of phosphorous acid.

8. The process of claim 5 wherein the aromatic compound is an aromatic hydrocarbon selected fro mthe group consisting of benzene, naphthalene, and alkyl derivatives of benzene and naphthalene.

9. The process of claim 5 wherein the reaction is conducted at a temperature above the dissociation temperature of the free-radical reactant and at a temperature below the decomposition temperature of the diester of the aromatic phosphonic acid.

No references cited.

UNITED STATES PATENT OFFICE
CERTIFICATE OF CORRECTION

Patent No. 3,054,821                      September 18, 1962

Robert J. Rolih et al.

It is hereby certified that error appears in the above numbered patent requiring correction and that the said Letters Patent should read as corrected below.

Column 1, lines 31 to 35, the left-hand portion of the formula should appear as shown below instead of as in the patent:

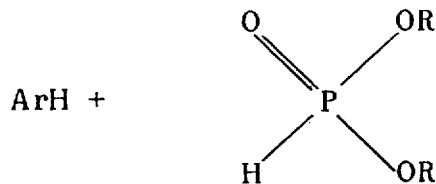

column 3, lines 54 and 55, for "naphthalenephosphate" read -- naphthalenephosphonate --.

Signed and sealed this 5th day of February 1963.

(SEAL)
Attest:
ERNEST W. SWIDER
Attesting Officer

DAVID L. LADD
Commissioner of Patents